(12) United States Patent
Pugia

(10) Patent No.: US 8,999,264 B2
(45) Date of Patent: Apr. 7, 2015

(54) HYDROPHILIC COATING FOR NONPOROUS SURFACES AND MICROFLUIDIC DEVICES INCLUDING SAME

(75) Inventor: Michael J. Pugia, Granger, IN (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 13/876,921

(22) PCT Filed: Sep. 26, 2011

(86) PCT No.: PCT/US2011/053253
§ 371 (c)(1),
(2), (4) Date: Jul. 16, 2013

(87) PCT Pub. No.: WO2012/050809
PCT Pub. Date: Apr. 19, 2012

(65) Prior Publication Data
US 2013/0287630 A1  Oct. 31, 2013

Related U.S. Application Data

(60) Provisional application No. 61/387,687, filed on Sep. 29, 2010.

(51) Int. Cl.
*B01L 3/00* (2006.01)
*C09D 139/04* (2006.01)
*C09D 133/26* (2006.01)

(52) U.S. Cl.
CPC ......... *C09D 139/04* (2013.01); *B01L 3/502707* (2013.01); *C09D 133/26* (2013.01); *B01L 2300/0803* (2013.01); *B01L 2300/0816* (2013.01); *B01L 2300/0864* (2013.01); *B01L 2300/0867* (2013.01); *B01L 2300/087* (2013.01); *B01L 2300/161* (2013.01); *B01L 2400/0406* (2013.01); *B01L 2400/0688* (2013.01); *Y10S 436/805* (2013.01); *Y10S 436/807* (2013.01); *Y10S 436/809* (2013.01)

(58) Field of Classification Search
USPC .............. 422/52, 63, 64, 82.05, 82.08, 82.09, 422/82.11, 407, 425, 426, 429, 500, 501, 422/502, 503, 504; 436/43, 52, 53, 149, 436/164, 165, 166, 172, 174, 180, 518, 524, 436/805, 807, 809
See application file for complete search history.

(56) References Cited

U.S. PATENT DOCUMENTS 5,260,129 A   11/1993   Scholl et al.
5,700,559 A   12/1997   Sheu et al.
(Continued)

FOREIGN PATENT DOCUMENTS

WO   2009014829 A2   1/2009

OTHER PUBLICATIONS

International Search Report and Written Opinion of International Patent Application No. PCT/US2011/053253 mailed Feb. 14, 2012.
(Continued)

*Primary Examiner* — Dennis M White
(74) *Attorney, Agent, or Firm* — Noam R. Pollack

(57) ABSTRACT

A coating formula and method for surface coating non-porous surfaces. Microfluidic devices including said coating achieve desired properties including increased hydrophilicity, improved adhesion, stability and optical clarity.

14 Claims, 6 Drawing Sheets

(56) References Cited

U.S. PATENT DOCUMENTS

| | | |
|---|---|---|
| 5,807,636 A | 9/1998 | Sheu et al. |
| 5,837,377 A | 11/1998 | Sheu et al. |
| 6,296,126 B1 | 10/2001 | Peters |
| 7,094,354 B2 | 8/2006 | Pugia et al. |
| 2003/0055149 A1 | 3/2003 | McGee |
| 2003/0059948 A1 | 3/2003 | Hildenbrand et al. |
| 2006/0057209 A1 | 3/2006 | Chapman et al. |
| 2006/0121217 A1 | 6/2006 | Childs et al. |
| 2008/0305349 A1 | 12/2008 | Nahm |
| 2010/0198168 A1 | 8/2010 | Rooijmans |
| 2011/0149277 A1 | 6/2011 | Pugia et al. |

OTHER PUBLICATIONS

Pugia et al., "Microfluidic Tool Box as Technology Platform for Hand-Held Diagnostics", Clinical Chemistry 51:10 (2005), pp. 1923-1932.

European Search Report and Search Opinion of European Application No. EP11832999 dated Jul. 10, 2014.

HYDROPHILIC COATING FOR NONPOROUS SURFACES AND MICROFLUIDIC DEVICES INCLUDING SAME

FIELD OF THE INVENTION

This invention relates to hydrophilic coatings and more specifically, to hydrophilic coatings for nonporous surfaces such as those utilized in microfluidic devices used in medical diagnostic testing.

BACKGROUND OF THE INVENTION

Microfluidic Disposables

Diagnostic analysis employing microfluidic techniques have become prominent in recent years. Microfluidic disposables have been designed for various biological samples, including urine and blood assays, including clinical chemistries, immunoassay and molecular test types (Pugia Clin. Chem. 51:10, 1923-1932, 2005). In general, these microfluidic disposables contain chambers interconnected by micron sized capillaries through which a fluid is passed to react with various reagents. These microfluidic disposable are fabricated from plastics, films and glasses with highly hydrophilic materials. Highly hydrophilic materials are advantageous in moving fluids through the micron sized capillaries and chambers of microfluidic devices and disposables, as well as spreading fluid evenly across the surface of a slide. Such microfluidic devices have also been adapted to microscopic analysis of urine sediments and cellular analysis, for examples see U.S. Pat. No. 7,094,354 and WO2010022019, incorporated herein by reference in their entirety.

Hydrophilicity

Surfaces of microfluidic disposable are generally made hydrophilic by plasma gas treatments. Plasma coating stability is generally unsuitable for medical diagnostics. Certain polymer monomers can be processed in gas plasma to produce stable coating. However, this type of fabrication can be cost prohibitive for disposables. Surface coatings of hydrophilic polymer are generally non-adhering to adhesive which make them unsuitable for use in microfluidic disposables. Molding hydrophilic polymers into the plastic are generally not successful as hydrophilic polymer chains do not easily bloom to the surface and surfaces tend to be full of imperfections. In all current process, the optical clarity of the hydrophilic coating is imperfect making high powered microscopic cell analysis impractical.

Hydrophilic coating of porous materials has been done by mixing polyelectrolyte of opposite charges. At least one of these polymers has properties allowing traditional coating methods such as spin coating, spray coating, saturation and mist. The polyelectrolyte are typically anionic ($\alpha$), cationic ($\beta$), or zwiterionic ($\alpha,\beta$). (See U.S. Pat. Nos. 5,700,559; 5,807,636; and 5,837,377, incorporated herein by reference in their entirety).

This method of coating was tried on non-porous materials such as polystyrene, the preferred material for microfluidic disposables. Molded polystyrene was coated with anionic ($\alpha$), cationic ($\beta$) and zwiterionic ($\alpha,\beta$) polyelectrolyte polymers typical of the prior art (See Table 1). The anionic ($\alpha$) polyelectrolyte tested include polyacrylic acid (PAA), poly-(sodium-4-styrenesulfonate) (PSS) and poly methylacrylic acid (PMA). Cationic ($\beta$) polyelectrolyte tested include polyethylenimine (PEI), polyvinylpyrrolidone (PVP) and poly (acryamide) (PAamide). Zwiterionic ($\alpha,\beta$) polyelectrolyte tested include poly(2-acrlyamido-2-methyl-I-propanesulfonic acid) (PAMPSA).

TABLE 1

Mixing polyelectrolyte of opposite charges coating.

| $\alpha$ | $\beta$ | $\alpha, \beta$ | Contact angle | Clarity |
|---|---|---|---|---|
|  | PVP | PAMPSA | 54 | cloudy |
| PVA |  | PAMPSA | 65 | cloudy |
| PAA |  | PAamide | 75 | cloudy |
| PAA | PEI |  | 66 | cloudy |
| PSS | PEI |  | 65 | cloudy |
| PMA | PEI |  | 63 | cloudy |

The contact angle of uncoated non-porous molded polystyrene with a rough surface was 69° typical of a hydrophobic surface. A smooth surface molded polystyrene had a contact angle >100°. A desired result was a contact angle of <40° and more preferably <20° for a highly hydrophilic surface. The conclusion was that the prior art method did not teach how to make a hydrophilic surface on a non-porous film.

Optical Clarity

Optical clarity is another criterion for hydrophilic coatings, especially for microscopic slides and other reagents read optically. Cell analysis for micron sized particles further requires very clear surfaces. For example, there should be no or few regions of defects. The coating should look optically clear with visual inspection and upon 400× microscope inspection, there should be no more than about 1 defect of 1 μm seen for every 2-3 frames.

Stability and Adhesion

The stability of the coating and adhesion are also important criteria for a hydrophilic microfluidic device. The coating surface should not be sticky to touch and should allow adhesion of pressure sensitive adhesive to the surface to allow a lid to be sealed over the device to prevent leaking. In the example above, the PVP and PAMPSA combination provided a slight improvement in hydrophilicity. An additional experiment was conduct by coating with PVP ($\alpha$) and PAMPSA ($\alpha,\beta$) separately which showed PVP alone caused the hydrophilic effect. PVP is amine functional polymer ($\alpha$). Although the coating was clear, it easily smeared into a non-optical surface as it was not stable (soft to touch) and could not be laminated with adhesive.

Accordingly, the previously known formulations are not suitable for optical microfluidic analysis of samples. Therefore, there is a need in the art for an inexpensive, but accurate formulation and method of making non-porous surfaces highly hydrophilic, optically clear, and capable of adhering to adhesive, while retaining stability.

SUMMARY OF THE INVENTION

The present invention provides an inexpensive, but accurate formulation and method for making non-porous surfaces highly hydrophilic, optically clear, and capable of adhering to adhesive, while retaining stability.

The invention in one aspect is a new and improved hydrophilic, optically clear, and stable coating.

In another aspect, the invention is a new and improved microfluidic device or slide with at least one coated surface.

In yet another aspect, the invention is a new and improved method for manufacturing a microfluidic device.

In a further aspect, the invention is a new and useful method for improving the hydrophilicity and/or surface energy of a surface.

In yet a further aspect, the invention is a new and useful kit including the coatings discussed herein and a slide or microfluidic device.

Additional features and advantages of the invention will be made apparent from the following detailed description of illustrative embodiments that proceeds with reference to the accompanying drawings.

BRIEF DESCRIPTION OF THE DRAWINGS

A more complete appreciation of the present invention and many of the attendant advantages thereof will be readily understood by reference to the following detailed description when taken in conjunction with the accompanying drawings, in which.

DESCRIPTION OF THE PREFERRED EMBODIMENTS

Figure 1:
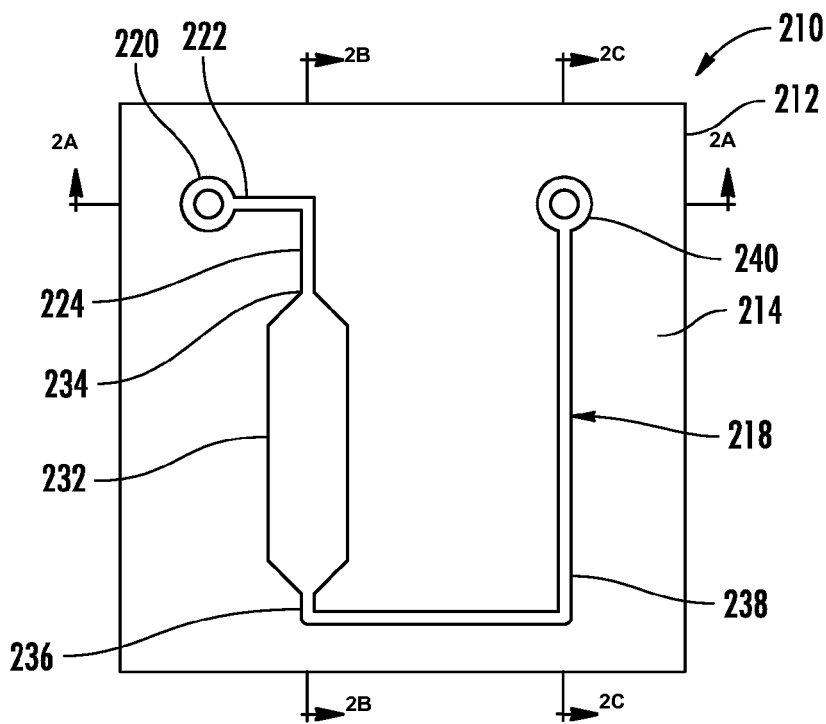
FIGS. 1-13 show various microfluidic devices according to a number of embodiments of the invention herein.

Referring now to the drawings in which like reference characters designate identical or corresponding parts throughout the several views, a preferred embodiment of the invention will now be described with reference to FIGS. 1-16.

The invention in one aspect is directed to a composition including an amine functional polymer and a nonionic polyether carbonate. The composition has been found to serve as an exceptional coating for microfluidic chips and slides that increases hydrophilicity, maintains optical clarity and transparency, and is capable of adhering to adhesive, while retaining stability. The slides and microfluidic chips of the present invention are discussed in greater detail below, but are referred to collectively as test devices.

In a preferred embodiment, the amine functional polymer is one of poly(diallydimethyl ammonium chloride) and, more preferably, poly(acrylamide-co-diallyldimethyl ammonium chloride). The composition is created by mixing the amine functional polymer and the nonionic polyether carbonate. An effective ratio of amine functional polymer to nonionic polyether carbonate has been found to be in the range of 2:1 to 12:1 volume to volume, with 6:1 being preferred.

Once the mixture has been composed, the hydrophilicity of a test device can be improved by applying composition to the desired surface of the test device. Preferably, the coating has an average thickness of 0.01 to 4.0 mm, with 0.1 mm typical. It is understood that depending on the need for hydrophilicity and optical clarity, the composition can be applied to a portion of a surface of a test device, to an entire surface, to some surfaces or all surfaces. Preferably, the coating composition will be applied to an optically clear and transparent surface that is intended to be used in optical measurement of a sample fluid. Generally, these optical measurements are used to detect the presence of an analyte, determine the concentration of an analyte, or to identify and characterize components in a sample, such as cells and urine sediment.

The inventor was surprised to find that the combination of amine functional polymer (α) (PDDA) with polyether carbonate (KOK) greatly improved hydrophilicity and maintained optical clarity (see Table 2).

TABLE 2

Hydrophilic amine functional polymer coating.

| KOK | α | β | α, β | Contact angle | Optical Clarity |
|---|---|---|---|---|---|
|  |  | PVP |  | 54 | clear |
|  |  | PADDA |  | 90 | clear |
|  |  | PAAM |  | 90 | clear |
|  |  | PEI |  | 71 | clear |
|  |  | PDDA |  | 73 | clear |
| KOK |  | PDDA |  | 22 | clear |
|  | PAA | PDDA |  | 72 | cloudy |
|  | PSS | PDDA |  | 86 | cloudy |
|  | PMA | PDDA |  | 72 | cloudy |
|  |  | PDDA | PAMPSA | 65 | cloudy |

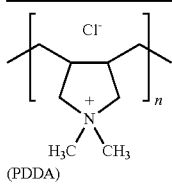
(PDDA)

KOK is a BIS(POLYPROPYLENE) GLYCOL CARBONATE. The R can be an H, methyl, ethyl, propyl or other alkyl group. Methyl was used in the experiments herein. The n may be 1 to 1000. n=40 is what was used herein.

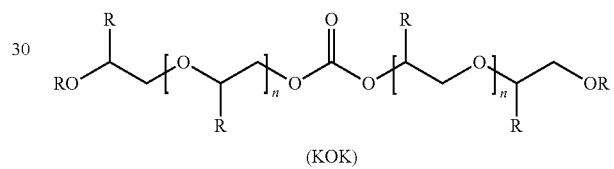
(KOK)

See U.S. Pat. No. 5,424,215 incorporated herein by reference in its entirety. The success of the combination was especially surprising because other amine functional polymers (α) such as PAAM, PEI, PADDA and PDDA were not even slightly hydrophilic, although all were found to be optically clear (See Table 2). The combination of hydrophilic amine functional polymer with either α or α,β polymer did not make the surface hydrophilic. These counter charge polymers also clouded the coating. However, it did stabilize the coating especially when the poly amine was PADDA. The copolymer of PADDA was even more stable. When non-ionic polyethers were tried including polyvinyl alcohol (PVA), polyethylene glycol (PEG), polypropyl glycol (PPG), instead of KOK, the surface was not hardened. This combination of polyethers and hydrophilic amine functional polymer was not stable to adhesion and soft and easily wiped off the surface. A hardened durable surface is a requirement for microfluidic devices. KOK plus the amine functional polymer worked surprisingly well. It is believed that the KOK reacts with the polyamine on heating to make a hard surface.

Additives to the hydrophilic amine functional polymer coating were tried in an attempt to create a hardened durable surface to substitute and test the need for the non-ionic polyether carbonate (KOK). Other nonionic polymers and surfactants are additives common additives to polymer coatings used to increase binders. Non-ionic polyethers polymers tried included polyvinyl alcohol (PVA), polyethylene glycol (PEG), polypropyl glycol (PPG), and polyvinyl ethyl ether (PVEE). Other nonionic polymers tried included poly(vinyl propionate) (PVPr), and poly(octadecyl acrylate) (POA). Surfactants and binders were also added as a replacement and in addition to the nonionic polyether carbonate (KOK) with addition of ethylene oxide (poly(ethylene)glycols, poly(propylene)glycols, and alkyl ethers thereof), anionic (sodium dodecyl sulfate (SDS)), cationic (benzalkonium chloride BA) attempted. None of these compound increased hardness nor hydrophilicity. This supported the theory that the interaction between hydrophilic amine functional polymer (PDDA) and nonionic polyether carbonate (KOK) behaved uniquely and in an unexpected as compared to similar substances. The method of operation is believed to be a reaction to form amides from the polycarbonate although this has yet to have been confirmed.

A series of hydrophilic amine functional polymer were tried as improvements. The tertiary amine structures for Poly (diallydimethly ammonium chloride) (PDDA) and its co-block form poly(acryl amide-co-diallyldimethyl ammonium chloride) (PADDA) are compared below to primary amines poly(ethyleneimine) (PEI) and poly (allylamine hydrochloride) (PAAM) (See Table 3). Tertiary amine structures of PDDA and PADDA were preferred for greatest hydrophilicity, but all hydrophilic amine functional polymers were found to be suitable when combined with KOK. Inversely, the hydrophilic amine functional polymers were unsuitable without KOK.

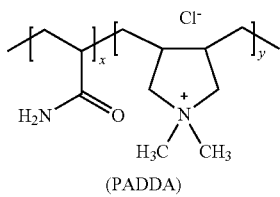

(PADDA)

Surprisingly the combination of a polycarbonate polyether glycol (KOK) not only caused a significant increase in hydrophilicity, but also remained clear. While polycarbonate polyether glycol (KOK) generally reduced adhesion, the selection of polyamine was found to compensate. Poly (acrylamide-co-diallyldimethyl ammonium chloride) and KOK had good adhesion, hydrophilicity, and stability. It believed that the amide further facilitates the reaction with KOK. As can be seen in the table below, all combinations of hydrophilic amines with KOK were suitable as a coating. Thus a contact angle of 40 or less is good enough, but PADDA was the most suitable.

TABLE 3

Hydrophilic amine functional polymer coating.

| Polycarbonate | Hydrophilic amine | Adhesion | Contact angle | Optical Clarity |
|---|---|---|---|---|
| none | PDDA | Good | 73° | clear |
| none | PAAM (15,000 MW) | Good | 78° | clear |
| none | PAAM (15,000 MW) | Good | 90° | clear |
| none | PEI | Fair | 84° | clear |
| none | PADDA | Good | 71° | clear |
| KOK | PDDA | Fair | 34° | clear |
| KOK | PAAM (15,000 MW) | Fair | 41° | clear |
| KOK | PAAM (15,000 MW) | Fair | 40° | clear |
| KOK | PEI | Fair | 43° | clear |
| KOK | PADDA | Good | 20° | clear |

As discussed above, the coating may be applied to any surface of a microfluidic device, as desired. Referring now to FIGS. 1 and 2A-C, shown therein is a microfluidic device 210 which comprises a substrate 212 which is constructed of a material which is conventionally used for making microfluidic "chips." The materials may include plastics such as polycarbonate, polystyrene, polyacrylates, or polyurethane, alternatively, they can be made from silicates, and/or glass. When moisture absorption by the plastic is not a substantial concern, the plastics preferably used may include, but are not limited to, ABS, acetals, acrylics, acrylonitrile, cellulose acetate, ethyl cellulose, alkylvinylalcohols, polyaryletherketones, polyetheretherketones, polyetherketones, melamine formaldehyde, phenolic formaldehyde, polyamides (e.g., nylon 6, nylon 66, nylon 12), polyamide-imide, polydicyclopentadiene, polyether-imides, polyethersulfones, polyimides, polyphenyleneoxides, polyphthalamide, methylmethacrylate, polyurethanes, polysulfones, polyethersulfones and vinyl formal. When moisture absorption is of concern, preferably the plastics used to make the chip include, but are not limited to: polystyrene, polypropylene, polybutadiene, polybutylene, epoxies, Teflon™, PET, PTFE and chloro-fluoroethylenes, polyvinylidene fluoride, PE-TFE, PE-CTFE, liquid crystal polymers, Mylar®, polyester, LDPE, HDPE, polymethylpentene, polyphenylene sulfide, polyolefins, PVC, and chlorinated PVC. In addition, ceramics, glass, cellulose acetate, silicon and gold are also suitable substrates.

The substrate 212 has an upper surface 214 and a lower surface 216. Formed into the substrate 212, by injection molding or etching, for example, is a microfluidic circuit 218 which comprises several ports, chambers and microconduits. More particularly, microfluidic circuit 218 comprises a sample inlet port 220, and a first sample microconduit 222 in fluid communication with a second sample microconduit 224. The sample inlet port 220 is in fluid communication with the first sample microconduit 222. The second sample microconduit 224 extends from the first sample microconduit 222 and fluidly connects to a reaction chamber 232 via a reaction chamber inlet 234.

Figure 2A:
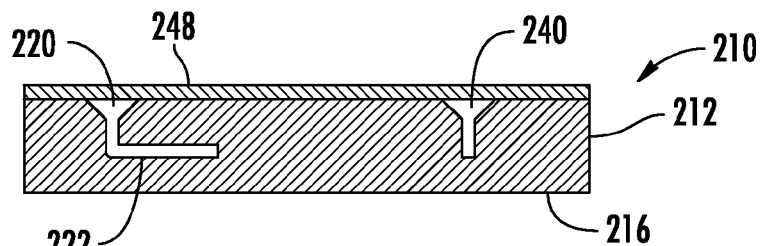
Figure 2B:
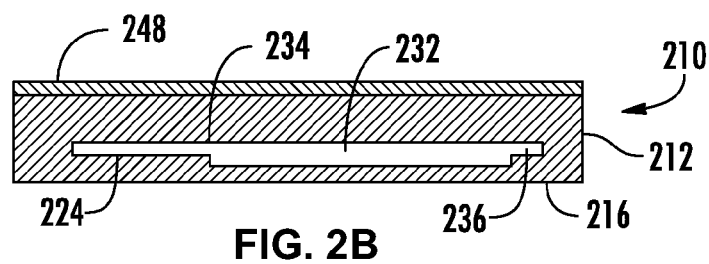
Figure 2C:
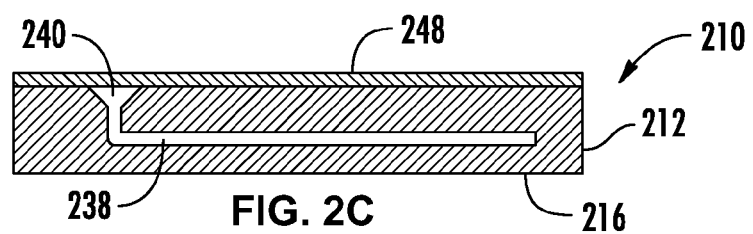
Figure 3:
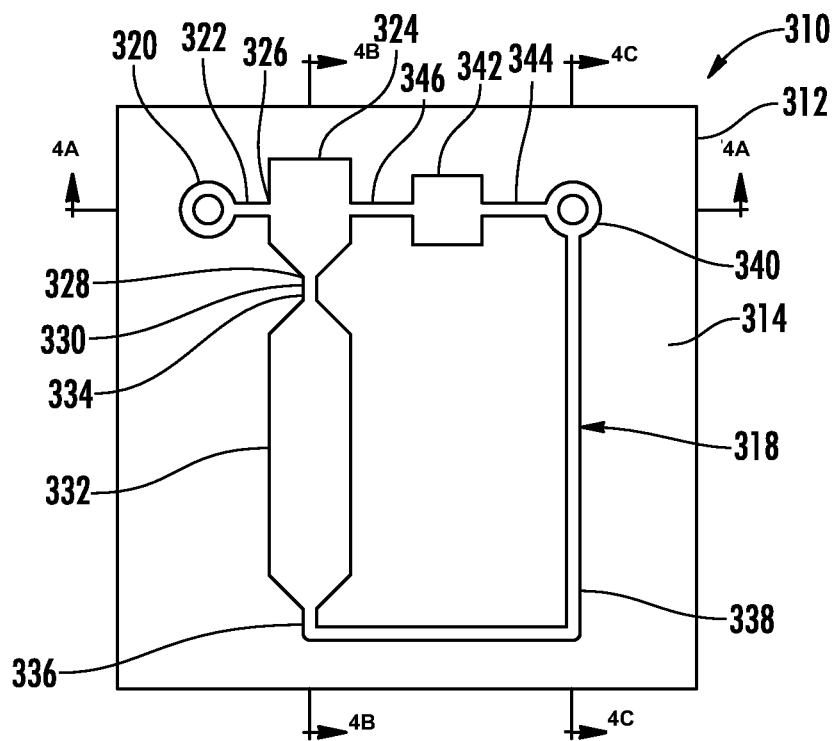

The reaction chamber 232 has a reaction chamber outlet 236 which continues as a reaction chamber outlet microconduit 238 and is connected to an air vent 240 such that the sample inlet port 222, reaction chamber 232, and the air vent 240 are in fluid communication. Further, FIGS. 2A-C show the microfluidic device 210 constructed with a cover layer 248 which is disposed over the upper surface 214 of the substrate 212. The cover layer 248 is preferably constructed of a polymeric or metallic material and may be opaque, translucent, transparent, or reflective, depending on the particular circumstance under which the microfluidic device 210 is intended to be used. The cover layer 248 is preferably attached, bonded, or otherwise affixed to the upper surface 214, for example by chemical, heat, adhesive, ultrasonic, or physical bonding. Preferably an upper surface 250 of the cover layer 248 has an adhesive material thereon for use in a circumstance when it is desired to connect the microfluidic device 210 to a fluid sampling device such as a urine container in a manner such as discussed in further detail below.

Once a fluid sample (such as blood or urine or any other fluid which can be analyzed in accordance with the presently claimed and disclosed inventive concept(s)) enters the sample inlet port 220 it passes into the reaction chamber 232 via the first sample microconduit 222 and the second sample microconduit 224. The fluid sample flows unidirectionally in a direction such that the fluid flows into the reaction chamber 232. Therefore the microfluidic circuit 218 is designed, in one embodiment, such that each microconduit 222, 224 and 238 comprises a capillary stop which functions in accordance with a desired unidirectional flow of the fluid sample. In particular, in one embodiment, microconduit 238 may comprise a capillary stop which is stronger than the capillary stops of microconduits 222 and 224 which flow into the reaction chambers 232 such that fluid preferentially flows from the sample inlet port 220 into the reaction chamber 232 and fills the reaction chamber 232 completely before flowing into microconduit 238. Conversely, it is desired that air movement though the microfluidic circuit 218 ahead of the fluid flow be substantially unimpaired so that air within the microfluidic circuit 218 can be purged therefrom through the air vent 240 as the fluid sample flows therethrough from the sample inlet port 220 to the reaction chamber 232.

Referring now to FIGS. 3 and 4A-C, shown therein is a microfluidic device 310 which comprises a substrate 312 which is constructed of a material conventionally used for making microfluidic "chips" as described elsewhere herein. The substrate 312 has an upper surface 314 and a lower surface 316. Formed into the substrate 312, by injection molding or etching, for example, is a microfluidic circuit 318 which comprises several ports, chambers and microconduits which are in fluid communication with each other by virtue of a loop configuration. More particularly, microfluidic circuit 518 comprises a sample inlet port 320, a sample chamber inlet microconduit 322, a sample chamber 324, a sample chamber inlet 326, and a sample chamber outlet 328. The sample inlet port 320 is in fluid communication with the sample chamber 324 via the sample chamber inlet microconduit 322. The microfluidic circuit 318 further comprises a sample chamber outlet microconduit 330 which extends from the sample chamber outlet 328 and fluidly connects the sample chamber 324 to a reaction chamber 332 via a reaction chamber inlet 334.

Figure 4A:
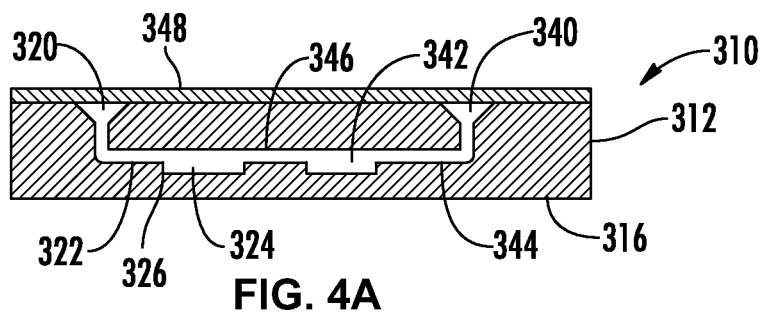
Figure 4B:
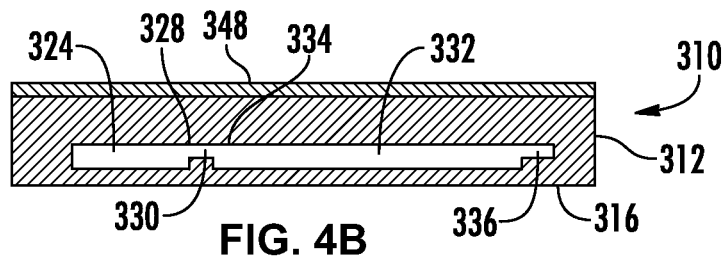
Figure 4C:
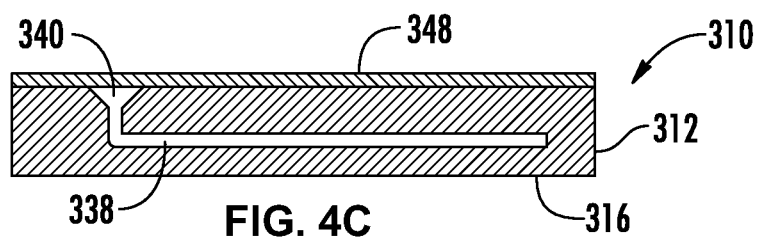
Figure 5:
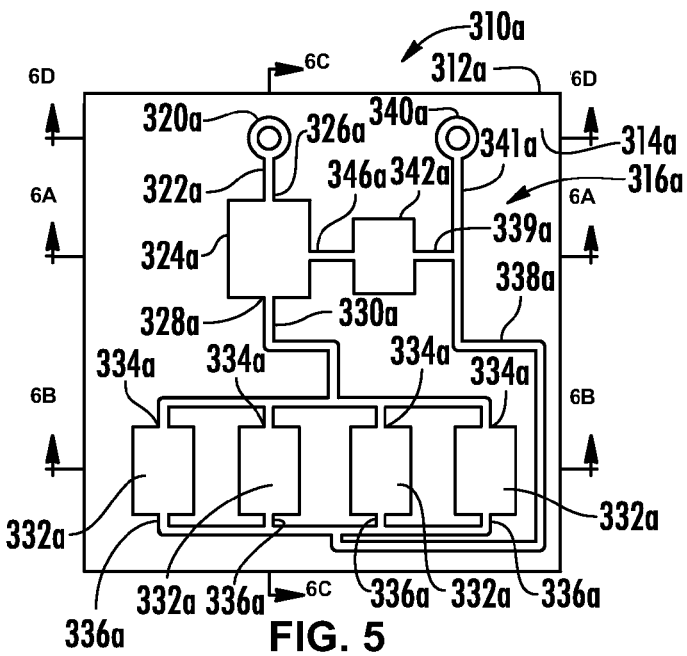
Figure 6A:
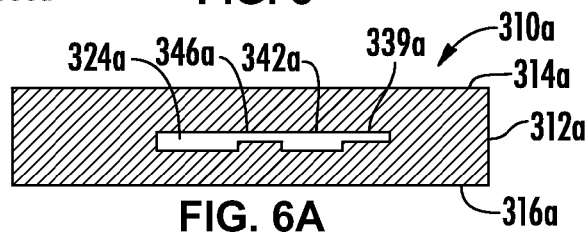
Figure 6B:
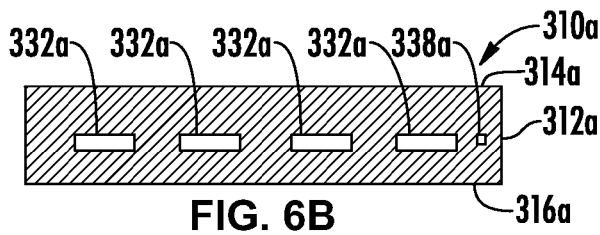
Figure 6C:
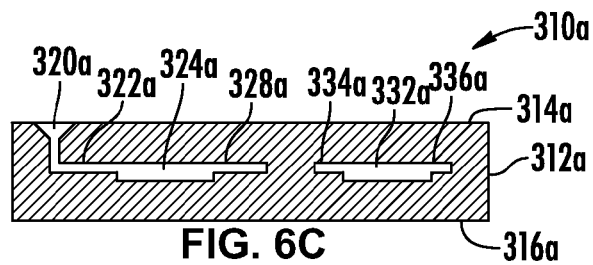
Figure 6D:
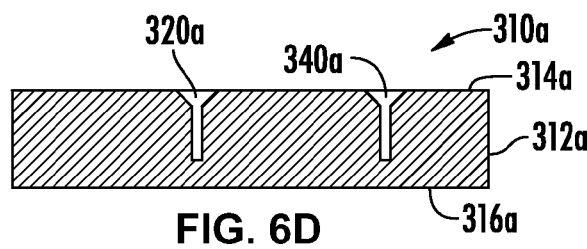

The reaction chamber 332 has a reaction chamber outlet 336 which continues as a reaction chamber outlet microconduit 338 and is connected to an air vent 340 which is connected to an overflow chamber 342 via an overflow chamber-air vent microconduit 344 such that the reaction chamber 332, air vent 340 and overflow chamber 342 are in fluid communication. Finally, the overflow chamber 342 and sample chamber 324 are connected by a sample chamber-overflow chamber microconduit 346 such that the overflow chamber 342 and sample chamber 324 are in fluid communication. In view of the above, it can be seen that the microfluidic circuit 318 comprises a loop such that each chamber and microconduit is in fluid communication. Further, FIGS. 4A-C show the microfluidic device 310 constructed with a cover layer 348 which is disposed over the upper surface 314 of the substrate 312. The cover layer 348 is preferably constructed in a manner as discussed above and is preferably attached, bonded, or otherwise affixed to the upper surface 314, for example by chemical, heat, adhesive or physical bonding. Preferably an upper surface 350 of the cover layer 348 has an adhesive material thereon for use in a circumstance when it is desired to connect the microfluidic device 310 to a fluid sampling device such as a urine container in a manner such as discussed in further detail below.

Once a fluid sample (such as blood or urine or any other fluid which can be analyzed in accordance with the presently claimed and disclosed inventive concept(s)) enters the sample inlet port 320 and passes into the sample chamber 324 via the sample chamber inlet microconduit 322, the fluid sample in sample chamber 324 preferably flows unidirectionally in a direction such that the fluid initially flows into the reaction chamber 332 rather than into the overflow chamber 342. Therefore the microfluidic circuit 618 is designed, in one embodiment, such that each microconduit 322, 330, 338, 344 and 346 comprises a capillary stop which functions in accordance with a desired flow of the fluid sample. For example, microconduit 346, between the sample chamber 324 and the overflow chamber 342, may comprise a capillary stop which is stronger than the capillary stop of microconduit 330 between the sample chamber 324 and the reaction chamber 332 such that fluid preferentially flows from the sample chamber 324 into the reaction chamber 332 rather than into the overflow chamber 342. It is thus desired, in one embodiment, that the flow of sample fluid within microconduits 322, 330, 338 and 344 be generally unimpeded relative to the flow of fluid in microconduit 346 between sample chamber 324 and overflow chamber 342. Alternatively, it may be desired that the capillary stop of microconduit 346 is stronger than the capillary stop of microconduit 330 but is weaker than the capillary stop of microconduit 338 and 344 such that the flow of the fluid sample preferentially is in the direction of the overflow chamber 342 when the reaction chamber 332 is full such that flow of fluid sample out of the reaction chamber 332 through outlet 336 is minimized to reduce the dilution of "signal" which emanates from the reaction chamber 332, due to possible dilution of fluid sample within the reaction chamber 332. Conversely, it is desired that air movement though the microfluidic circuit 318 ahead of the fluid flow be substantially unimpaired so that air within the microfluidic circuit 318 can be purged therefrom through the air vent 340 as the fluid sample flows therethrough from the sample chamber 324 to the reaction chamber 332.

Shown in FIGS. 5 and 6A-D is an alternate embodiment of a microfluidic device of the presently claimed and disclosed inventive concept(s) and is designated therein by reference numeral 310a. The microfluidic device 310a is constructed in a manner similar to that described above for microfluidic device 310. The microfluidic device 310a comprises a substrate 312a which has an upper surface 314a and a lower surface 316a. Formed into the substrate 312a in a manner as discussed elsewhere herein is a microfluidic circuit comprising a microfluidic circuit 318a which comprises a sample inlet port 320a, a sample chamber inlet microconduit 322a, a sample chamber 324a, a sample chamber inlet 326a, and a sample chamber outlet 328a. The sample inlet port 320a is in fluid communication with the sample chamber 324a via the sample chamber inlet microconduit 322a. The microfluidic circuit 318a further comprises a sample chamber outlet microconduit 330a which extends from the sample chamber outlet 328a and fluidly connects the sample chamber 324a with each of a plurality of reaction chambers 332a via reaction chamber inlets 334a.

The reaction chambers 332a have reaction chamber outlets 336a which merge to continue as a reaction chamber outlet microconduit 338a which is connected to an air vent 340a via an air vent microconduit 341a and which is connected to an overflow chamber 342a via a reaction chamber-overflow chamber microconduit 339a such that the reaction chambers 332a, air vent 340a, and overflow chamber 342a are in fluid communication. Finally, the overflow chamber 342a and sample chamber 324a are connected by a sample chamber-overflow chamber microconduit 346a such that the overflow chamber 342a and sample chamber 324a are in fluid communication. In view of the above, it can be seen that the microfluidic circuit 318a comprises a loop wherein adjacent chambers and microconduits are in fluid communication with each other. Further, the microfluidic device 310a is optionally constructed with a cover layer (not shown) which may be constructed as shown above for cover layer 348 of microfluidic device 310, and which, may have, like cover layer 348, an adhesive upper surface for connecting to a sampling device in a manner consistent with the presently claimed and disclosed inventive concept(s).

As for microfluidic device 310, the fluid sample in microfluidic device 310a preferably flows in a direction such that fluid initially flows from sample chamber 324a into the reaction chambers 332a rather than into the overflow chamber 342a. Therefore the microfluidic circuit 318a is designed, in one embodiment, such that each microconduit 322a, 330a, 338a, 339a, 341a and 346a comprises a capillary stop which functions in accordance with the desired flow direction of the fluid sample. For example, microconduit 346a, between the sample chamber 324a and the overflow chamber 342a may comprise a capillary stop which is stronger than the capillary stop of microconduit 330a between the sample chamber 324a and the reaction chambers 332a such that fluid preferentially flows into the reaction chambers 332a rather than into the overflow chamber 342a. It is thus desired that the flow of sample fluid within microconduits 322a, 330a, 338a, 339a and 341a be generally unimpeded relative to the flow of fluid in microconduit 346a between sample chamber 324a and overflow chamber 342a. Alternatively, it may be desired that the capillary stop of microconduit 346a is stronger than the capillary stop of microconduit 330a but is weaker than the capillary stop of microconduit 338a and 339a such that the flow of the fluid sample preferentially is in the direction of the overflow chamber 342a when the reaction chambers 332a are full such that flow of fluid sample out of the reaction chambers 332a through outlets 336a is minimized to reduce the dilution of "signal" which emanates from the reaction chamber 332a due to possible dilution of fluid sample within the reaction chamber 332a. Conversely, it is desired that air movement though the microfluidic circuit 318a ahead of the fluid flow be substantially unimpaired so that air within the microfluidic circuit 318a can be purged therefrom through air vent 340a as the fluid sample flows therethrough from the sample chamber 324a to the reaction chambers 332a. Further, it is contemplated herein that any of the microfluidic devices described, enabled, or supported herein, such as those shown in FIGS. 1-16D can be constructed in configurations similar to those shown in FIG. 1 or 2A-C, or modifications thereof, wherein they are constructed without a sample chamber and/or an overflow chamber, and/or wherein they are constructed in a loop configuration (such as in FIG. 3) or in a non-loop (non-continuous) path (such as in FIG. 1). Further, for any of the microfluidic devices contemplated herein, all or some of the microconduits may comprise configurations designed to act as capillary stops. Further, the arrangements and geometries of the chambers, microconduits, and pathways of the microfluidic circuits of the invention may be different from those shown herein, which are intended to be exemplary only and non-limiting.

Figure 7:
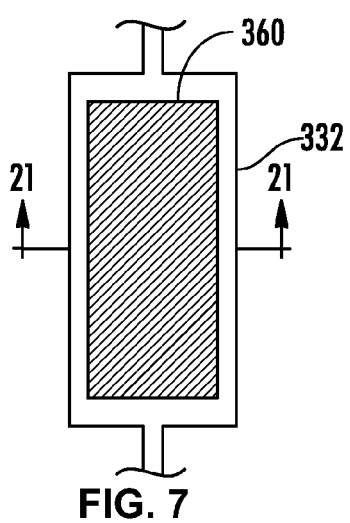
Figure 8A:
Figure 8B:
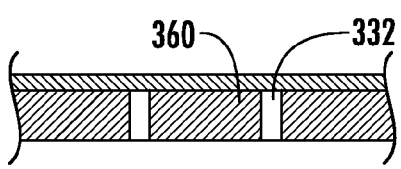
Figure 8C:
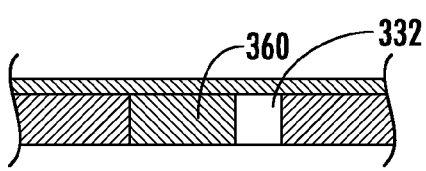

Shown in FIG. 7 is an embodiment of reaction chamber 332 (and may be considered to be representative of any reaction chamber of the presently claimed and disclosed inventive concept(s)) having a reagent substrate 360 disposed therein. Reagent substrate 360 preferably has, disposed thereon or therein, a dry or wet reagent for reacting with a component of the fluid sample for determining the presence and/or quantity of an analyte therein. Shown in FIGS. 8A-C are three configurations that the reagent substrate 360 can have within the reaction chamber 332. In FIG. 8A the reagent substrate 360 has dimensions such that it does not touch either the top or side walls of the reaction chamber 332. In FIG. 8B the reagent substrate 360 has dimensions such that an upper surface thereof touches the top of the reaction chamber 332 but does not touch the sidewalls thereof. In FIG. 8C the reagent substrate 360 has dimensions such that a side surface thereof touches a side wall of the reaction chamber 332 but does not touch the top of the reaction chamber 332. In an alternate embodiment (not shown) the reaction substrate 360 may substantially fill the reaction chamber 332.

Figure 9:
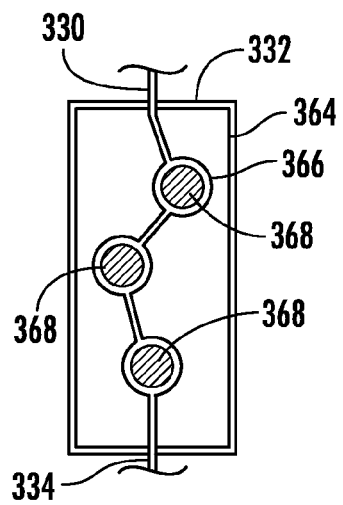
Figure 10:
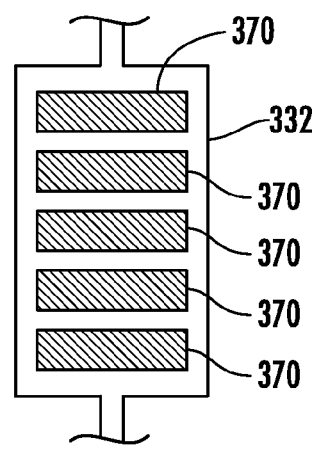
Figure 11:
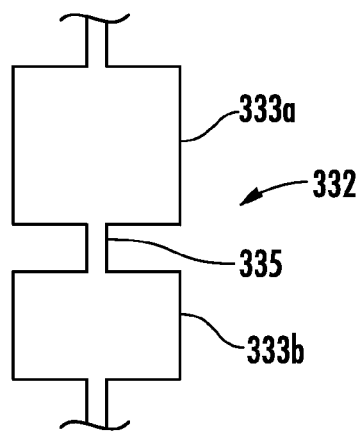

Shown in FIG. 9 is an embodiment of a reaction chamber 332 (and may be considered to be representative of any reaction chamber of the presently claimed and disclosed inventive concept(s)) which comprises a microfluidic chip 364 which comprises a plurality of wells 366 which are connected in fluid communication by microconduits which are in alignment with the reaction chamber inlet 230 and the reaction chamber outlet 334. Reagent substrates 368 are disposed within the wells 366. FIG. 10 shows an embodiment of the reaction chamber 332 (and may be considered to be representative of any reaction chamber of the presently claimed and disclosed inventive concept(s)) which comprises a plurality of separate reagent substrates 370. The reagent substrates 370 may be positioned within the reaction chamber 332 in any one of the configurations shown in FIGS. 8A-C, or in any combination thereof or in any other suitable configuration. Shown in FIG. 11 is an embodiment of a reaction chamber 332 (and may be considered to be representative of any reaction chamber of the presently claimed and disclosed inventive concept(s)) and which comprises a separate first reaction chamber 333a and a separate second reaction chamber 333b which are connected by a microconduit 335. Each reaction chamber 333a and 333b may comprise reagent substrates or reaction wells as shown in FIGS. 7-10, for example. Other embodiments of the presently claimed and disclosed inventive concept(s) which have more than two interconnected reaction chambers, for example 3, 4, 5, 6, 7, 8, 9, 10, or more reaction chambers are contemplated herein.

Figure 12:
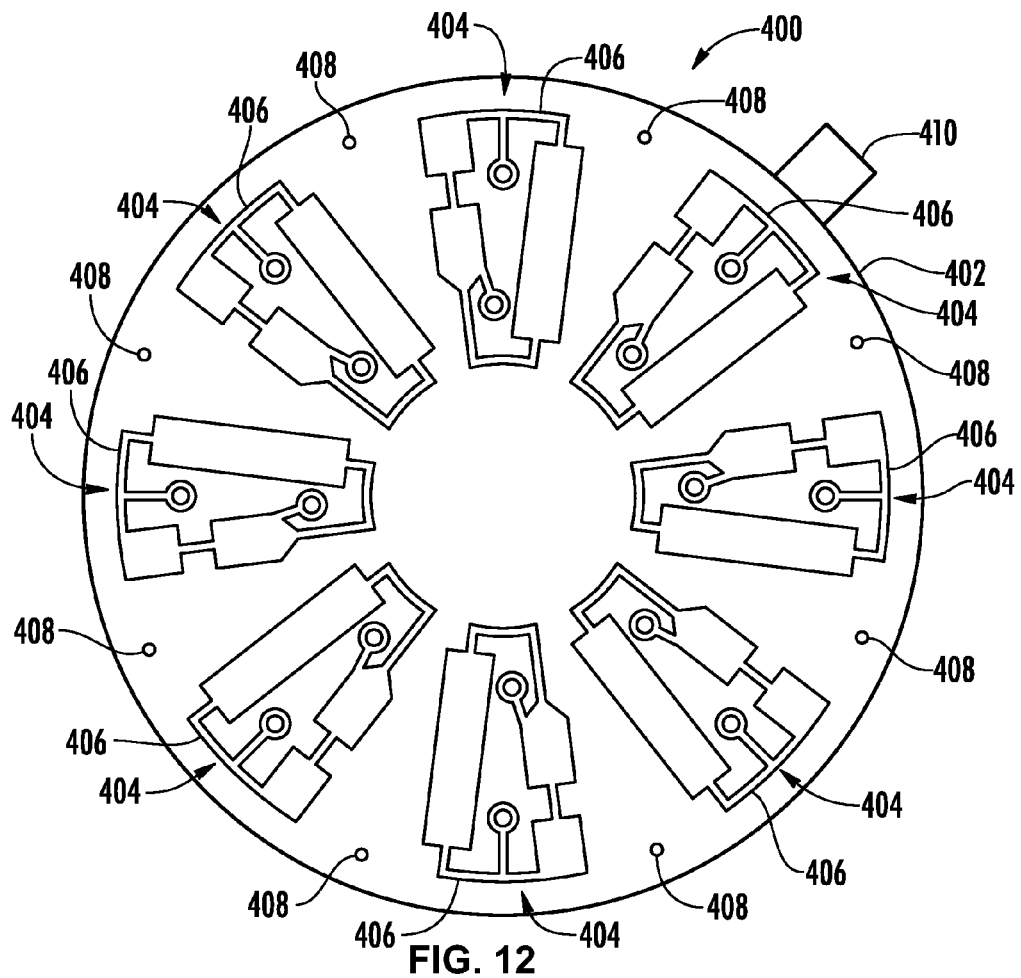

Shown in FIG. 12 and designated therein by the general reference numeral 400 is an alternate embodiment of a microfluidic device of the presently claimed and disclosed inventive concept(s). The microfluidic device 400 comprises a substrate 402 comprising the same material used to construct the microfluidic devices described above, for example a clear plastic. The substrate 402 has a shape of a disk and is constructed with a plurality of microfluidic units 404 each comprising a plurality of chambers, microconduits and ports or vents which together comprise a microfluidic circuit 606. Each microfluidic unit 404 functions independently of each other microfluidic unit 404. The microfluidic units 404 are arranged radially in an array within the substrate 402. Eight microfluidic units 404 are shown in the microfluidic device 400, but it will be understood than any number of microfluidic units 404 may be formed within the substrate 402, for example, 1-60 or even more of such units 404 may be incorporated into substrate 402 if the substrate 402 is of sufficient size to accommodate them. The microfluidic units 404 as shown have microfluidic circuits which are similar to the microfluidic circuit 318 of microfluidic device 310 of FIG. 3. However, it will be understood that the microfluidic device 400 may be constructed using any of the microfluidic circuits contemplated or described herein which function in accordance with the presently claimed and disclosed inventive concept(s). The microfluidic device 400 is constructed so as to be adapted for placement on, attachment to, or engagement, with a bottom surface of a liquid collection container. The microfluidic device 400 may have a plurality of indexing means 408 such as alignment depressions, holes, posts, notches, or optically-readable symbols, or any other device known to those of ordinary skill in the alignment art for aligning the microfluidic device 400 on a lower surface of a liquid collection container, or other sample container. The microfluidic device 400 may also have an extension 410 extending therefrom for enabling the device 400 to be grasped by the user, or for aiding in moving the position of the device for example, by rotation, on the sampling device.

As described above for microfluidic devices described elsewhere herein, the microfluidic device 400 may have a cover layer (not shown) disposed thereon and which functions in the same manner as the cover layers described in regard thereto (such as for adhesion to the liquid container). The microfluidic device 400 is shown as having a disk shape, however it will be understood that the shapes of the microfluidic devices of the presently claimed and disclosed inventive concept(s), include but are not limited to, round, square, rectangular, irregular, oval, star, or any other geometric shape which allows the microfluidic circuits therein the function in accordance with the presently claimed and disclosed inventive concept(s).

Figure 13:
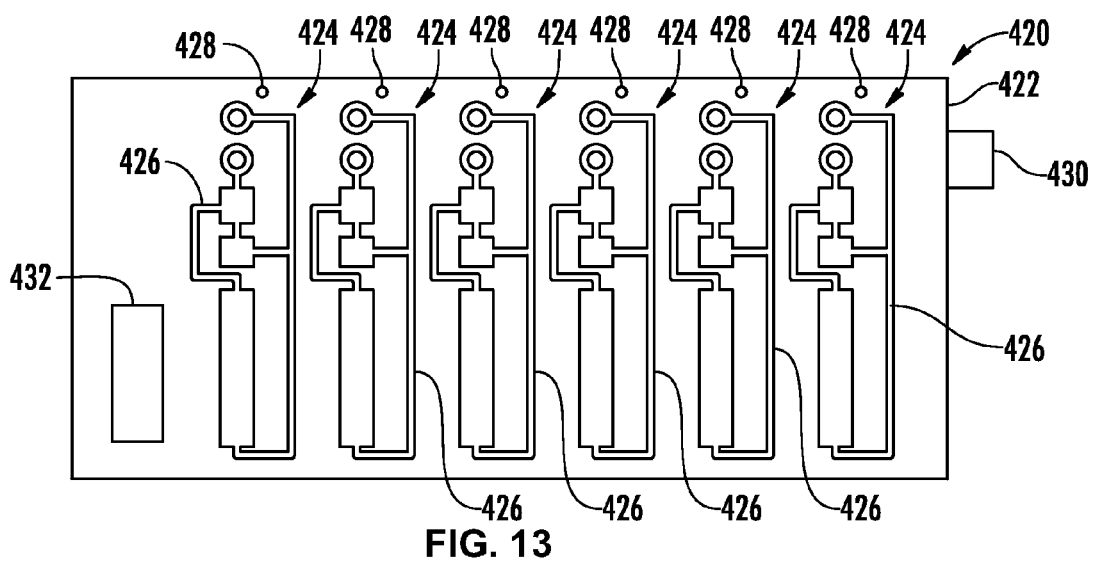

For example, shown in FIG. 13 is another embodiment of the presently claimed and disclosed inventive concept(s) which comprises a microfluidic device designated by the general reference numeral 420. The microfluidic device 420 comprises a substrate 422 comprising the same material used to construct the microfluidic devices described elsewhere herein, for example a clear plastic. The substrate 422 has a rectangular shape and is constructed with a plurality of microfluidic units 424 each comprising a plurality of chambers, microconduits and ports or vents which together comprise a microfluidic circuit 426. Each microfluidic unit 424 functions independently of each other microfluidic unit 424. The microfluidic units 424 are arranged linearly in an array within the substrate 422. Six microfluidic units 424 are shown in the microfluidic device 420, but it will be understood than any number of microfluidic units 424 may be formed within the substrate 422, for example 1-60 or even more such units 424 may be incorporated into the substrate 422 if the substrate 422 is of sufficient size to accommodate them. The microfluidic units 424 as shown have microfluidic circuits which are similar to the microfluidic circuit 318 of microfluidic device 310 of FIG. 16. However, it will be understood that the microfluidic device 420 may be constructed with any of the microfluidic circuits contemplated or described herein which function in accordance with the presently claimed and disclosed inventive concept(s). The microfluidic device 420 is constructed so as to be adapted for placement on, attachment to, or engagement, with a side or bottom surface of a liquid collection container. The microfluidic device 420 may have a plurality of indexing means 428 such as alignment depressions, holes, posts, notches, or optically-readable symbols, or any other device known to those of ordinary skill in the art for aligning the microfluidic device 420 on a lower surface of a urine cup, or other sample container. The microfluidic device 420 may also have an extension 430 extending therefrom for enabling the device 420 to be grasped by the user, or for aiding in moving the position of the device for example, by pulling, pushing or drawing the sampling device.

As described above for microfluidic devices described elsewhere herein, the microfluidic device 420 may have a cover layer (not shown) disposed thereon and which functions in the same manner as the cover layers described in regard thereto (such as for adhesion to the liquid container). The microfluidic device 420 is shown as having a rectangular shape, however it will be understood that the shapes of the microfluidic devices of the presently claimed and disclosed inventive concept(s), include but are not limited to, round, square, rectangular, irregular, oval, star, or any other geometric, symmetric or asymmetric shape which allows the microfluidic circuit or circuits therein to function in accordance with the presently claimed and disclosed inventive concept(s). Further, any of the microfluidic devices described elsewhere herein may comprise an optically-readable or machine-readable symbol thereon, such as a bar code, as indicated by symbol 432 on microfluidic device 420.

The microfluidic device may have microstructures. The microstructures may be coated with the coating described herein. By "microstructures" it is meant structural features created in microfluidic chips which direct the flow of the liquid sample to the reagent in a predetermined manner, rather than randomly. Two preferred microstructures include an array of posts disposed so that the liquid has no opportunity to pass through a chamber in a straight line. The liquid is constantly forced to change direction as it passes through the array of posts. At the same time, the dimensions of the spaces between the posts are small enough to produce capillary forces inducing flow of the liquid. Air is purged from the reagent area as the sample liquid surges through the array of posts. Other types of microstructures which are useful include three dimensional post shapes with cross sectional shapes that can be circles, stars, triangles, squares, pentagons, octagons, hexagons, heptagons, ellipses, crosses or rectangles or combinations. A second type of microstructure includes grooves or weirs that are disposed perpendicularly to the direction of liquid flow to provide a uniform liquid front. Microstructures with two dimensional shapes such as ramps leading up or down are also useful. Such ramps may include grooves at a right angle to the liquid flow to assist moving liquid or be curved. The number and position of the microstructures depends on the capillary force desired for a particular reagent as well as the direction and location that the fluid flow is to occur. Typically a larger number of microstructures increase the capillary flow. As few as one microstructure can be used.

The microstructure may or may not contain additional geometric features to aid direct flow toward the reagent. These geometries can include rounded, convex, or concave edges, indentations, or grooves as well as partial capillaries. For example each of the posts can contain one or more wedge-shaped cutouts which facilitate the movement of the liquid onto the substrate containing the reagent. Such wedge-shaped cutouts are shown in U.S. Pat. No. 6,296,126.

Figure 14:
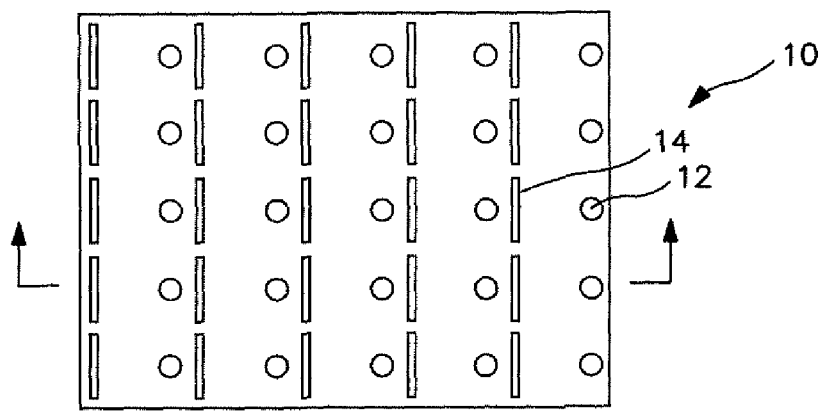
FIGS. 14-16 show a slide according to one embodiment of the present invention.
Figure 15:
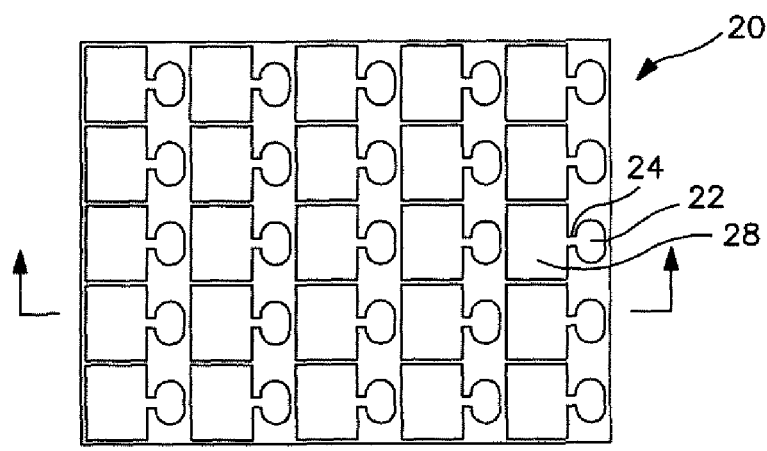
Figure 16:
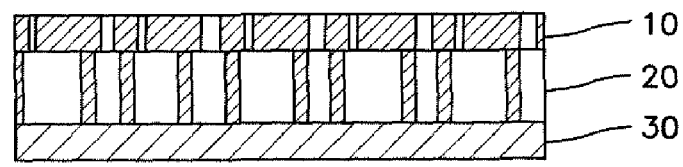

A preferred embodiment for a slide coated with the coatings described herein is shown in the FIGS. 14-16. The slide combines three layers (10, 20, and 30 in FIG. 16) and can receive 25 individual samples. The base layer 30 is an optically clear material, with high surface energy relative to the sample, such as cellulose acetate, the top layer 10 is a second sheet of the optically clear material with high surface energy relative to the sample (e.g. cellulose acetate) that has been cut to provide a vent slot 14 for removing air as liquid is introduced and an opening 12 through which the sample is introduced by a pipette. The surface energy can be enhanced with the coatings described herein without disturbing the optical clarity. The middle layer 20 is a sheet of polyethylene terephthalate that has been cutout to provide an inlet chamber 22 and a viewing chamber 28, the two chambers connected by a capillary passageway 24. The middle layer has a sheet of an acrylic coated tape (e.g. 3M9494) on either side to bind the middle layer to both the top and bottom layer.

FIG. 14 shows the top layer 10 as it would be seen by one using the slide. The user would dispense urine or other bodily fluid from a pipette in a measured amount into inlet opening 12 and air would be displaced through vent 14. FIG. 15 shows the middle layer 20 and its cutouts that form two chambers and an interconnecting capillary passageway. The liquid would flow into inlet chamber 22 and then through capillary 24 into the viewing chamber 28 for inspection. The third layer 30 (see FIG. 16) is a base layer which, being optically clear, permits inspection from above or below the viewing chamber, that is, through the clear top layer or the clear base layer. As discussed above, the applied coating would not interfere with the optical clarity.

POSITIONING OF THE COATING ON THE DEVICE: The coating may be applied to portions or the entire surface in contact with the liquid moving throughout the device including chambers viewing areas, and capillaries, this includes the base, the walls, the top or lid, and the micro structures in the flow. Determination of where to apply the coating is made based upon the fluid requirements of the device.

Example 1

A coating was affected by:
Making a part 1 of the coating solution as 6 ml RO-D1 water with 900 uL Hydrophilic amine (e.g. PADDA in 10% in water) with stirring to dissolve.
Make a part 2 of the coating solution as 6 ml RO-D1 water with 150 uL polycarbonate KOK (NEAT) with stirring to dissolve.
Mix Parts 1 and 2 together with stirring.
Add 12 mL ethanol absolute slowly with stirring to complete solution
Apply to surface to be coated (plastic, glass or paper)
Dried in 93 C oven with air flow for 5 minutes
Measure the hydrophilicity by applying a 4 uL of water droplet and a digital contact angle measurement equipment.
Measure the adhesion force to polyacyrlic adhesive for glass and plastic
Measure the optical clarity on a glass slide using 400× magnification by optical microscope.

The novel polymeric hydrophilic coating formula was coated onto microscope glass and plastic slides. All properties observed with polystyrene were obtained including increased hydrophilicity, stability, adhesion, and optical clarity. Maintaining a highly hydrophilic surface is particular important in microscopic analysis as cells and particles are rapidly adhered to hydrophilic surfaces allowing higher resolution in the microscopic image and quicker assay times. The importance of being able to have an optically clear coating allows the addition of stains and other reagents to the slide. This "reagent slide" allows sediment such as casts be differentiated into non-pathological and pathological casts.

TABLE 4

Hydrophilic amine functional polymer coating correlation to sediment adhesion to surface.

| Optical layer | Contact Angle (mean, SD) | Surface Energy dynes/cm | Adhering sediment |
|---|---|---|---|
| Polysytrene | 86.0 | 33.2 | no |
| Hydrophobic Glass Slide | 72.0 | 40.0 | no |
| Mildly hydrophilic Glass Slide | 57.0 | 50 | yes |
| Cellulose acetate | 52.0 | 50.0 | yes |
| Polymeric hydrophilic coating of Glass Slide | 18.0 | 68.7 | Rapidly |

While the present invention has been described in connection with the exemplary embodiments of the various figures, it is not limited thereto and it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims. Also, the appended claims should be construed to include other variants and embodiments of the invention, which may be made by those skilled in the art without departing from the true spirit and scope of the present invention.

What is claimed is:

1. A test device for analyzing a sample, comprising:
At least one nonporous surface coated with a coating comprising a mixture of an amine functional polymer and KOK.

2. The test device of claim 1 wherein at least a portion of at least one of said at least one nonporous surface is optically clear.

3. The test device of claim 1 wherein said coating has an average thickness of 0.01 to 4.0 mm thick, with 0.1 mm typical.

4. The test device of claim 1, wherein said amine functional polymer is one of poly(diallydimethyl ammonium chloride) and poly(acrylamide-co-diallyldimethyl ammonium chloride).

5. The test device of claim 1, wherein a ratio of amine functional polymer to said nonionic polyether carbonate is 2:1 to 12:1 volume to volume.

6. A composition, comprising:
an amine functional polymer; and
KOK.

7. The composition of claim 6, wherein said amine functional polymer is one of poly(diallydimethyl ammonium chloride) and poly(acrylamide-co-diallyldimethyl ammonium chloride).

8. The composition of claim 6, wherein the ratio of amine functional polymer to said nonionic polyether carbonate is 2:1 to 12:1 volume to volume.

9. A method of improving hydrophilicity of a test device having at least
one surface intended to contact and manipulate fluids, comprising the steps of:
combining an amine functional polymer and KOK to form a combination; and
applying said combination to at least a portion of at least one of said at least one surface of said test device.

10. The method of claim 9, wherein said amine functional polymer is one of poly(diallydimethyl ammonium chloride) and poly(acrylamide-co-diallyldimethyl ammonium chloride).

11. The method of claim 9, wherein the ratio of amine functional polymer to said nonionic polyether carbonate is 2:1 to 12:1 volume to volume.

12. The method of claim 9, wherein said coating has an average thickness of 0.01 to 4.0 mm thick, with 0.1 mm typical.

13. The method of claim 9, wherein said coating is applied to at least a portion of at least one of said at least one surface of said test device which is optically clear.

14. The method of claim 9, wherein said coating is applied by one of the following methods: spin coating, spray coating, saturation, mist, chemical vapor deposition, physical vapor deposition, Dip-coating, and Roll-to-roll coatings.

* * * * *